United States Patent
Granger et al.

(10) Patent No.: US 10,690,939 B2
(45) Date of Patent: Jun. 23, 2020

(54) SPECTACLES COMPRISING A PAIR OF PROGRESSIVE LENSES

(71) Applicant: Essilor International, Charenton le Pont (FR)

(72) Inventors: Berangere Granger, Charenton le Pont (FR); Sebastien Fricker, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 440 days.

(21) Appl. No.: 15/329,453

(22) PCT Filed: Jul. 29, 2015

(86) PCT No.: PCT/EP2015/067339
§ 371 (c)(1),
(2) Date: Jan. 26, 2017

(87) PCT Pub. No.: WO2016/020229
PCT Pub. Date: Feb. 11, 2016

(65) Prior Publication Data
US 2019/0155056 A1    May 23, 2019

(30) Foreign Application Priority Data
Aug. 4, 2014   (EP) ..................... 14306235

(51) Int. Cl.
*G02C 7/02*     (2006.01)
*G02C 7/06*     (2006.01)
(Continued)

(52) U.S. Cl.
CPC ............. *G02C 7/065* (2013.01); *G02C 7/027* (2013.01); *G02C 7/066* (2013.01)

(58) Field of Classification Search
CPC . G02C 7/06; G02C 7/061; G02C 7/04; G02C 7/02; G02C 5/00; A61B 3/1005; B24B 9/146
(Continued)

(56) References Cited

U.S. PATENT DOCUMENTS

2008/0273170 A1    11/2008  Watanabe
2010/0079722 A1    4/2010   Guilloux et al.
(Continued)

FOREIGN PATENT DOCUMENTS

EP   1 767 983 A1   3/2007
EP   1 950 601 A1   7/2008
WO   WO 2014/001494 A1   1/2014

OTHER PUBLICATIONS

International Search Report dated Nov. 5, 2015, in PCT/EP2015/067339 filed Jul. 29, 2015.

*Primary Examiner* — Dawayne Pinkney
(74) *Attorney, Agent, or Firm* — Oblon, McClelland, Maier & Neustadt, L.L.P.

(57) ABSTRACT

A pair of spectacle progressive lenses configured for a wearer suffering from convergence insufficiency or imbalance. The lens of the pair which is dedicated to the dominant eye has inset values appropriate for matching convergence of the dominant eye, but the other lens of the pair, which is dedicated to the non-dominant eye, has inset values substantially equal to zero. Such lens pair helps in suppressing the non-dominant eye for intermediate and near vision tasks, therefore avoiding or limiting symptoms of convergence insufficiency.

18 Claims, 10 Drawing Sheets

(51) Int. Cl.
G02C 7/00 (2006.01)
G02C 5/00 (2006.01)
G02C 3/00 (2006.01)

(58) Field of Classification Search
USPC ............ 351/159.41–159.43, 159.74–159.77, 351/159.8, 41, 159.01
See application file for complete search history.

(56) References Cited

U.S. PATENT DOCUMENTS

2010/0110373 A1* 5/2010 Drobe .................... G02C 7/025
351/204
2015/0146164 A1 5/2015 Contet et al.

* cited by examiner

SPECTACLES COMPRISING A PAIR OF PROGRESSIVE LENSES

The invention relates to spectacles comprising a pair of progressive lenses, and to a method for producing the first and second lenses of spectacles.

BACKGROUND OF THE INVENTION

Convergence insufficiency or convergence disorder is a sensory and neuromuscular anomaly of the binocular vision system, consisting of a reduced ability of the eyes to turn towards each other, or sustain convergence. It is observed a dyssynergia of the ocular movements, in particular a speed difference between both eyes.

The symptoms and signs associated with convergence insufficiency are related to prolonged, visually demanding, near-centered tasks. They may include, but are not limited to, diplopia (double vision), asthenopia (eye strain), transient blurred vision, difficulty in sustaining near-visual function, abnormal fatigue, headache, and abnormal postural adaptation, among others.

One solution for treating a wearer having convergence insufficiency is attending orthoptics sessions. However, visual training may not always work on presbyopic patients.

Another solution consists in compensating for such convergence insufficiency by using a prescription prism for at least one of the wearer's eyes. However, its efficiency may vanish with time and the prism value has then to be increased.

Therefore, there is currently no satisfying solution for an ophthalmic lens wearer who suffers from oculomotor imbalance. This applies in particular for wearers who suffer in addition from presbyopia.

Starting from this situation, an object of the present invention consists in efficiently taking into account the existence of an oculomotor disorder such as the convergence insufficiency when designing a progressive surface.

Another object is avoiding that the troubles caused by convergence insufficiency disturb the patient when performing near-vision tasks.

SUMMARY OF THE INVENTION

For meeting these objects or others, a first aspect of the present invention proposes spectacle comprising progressive lenses, each lens separately having a far vision point, a near vision point, and a meridian line which is defined by a set of gaze directions, each gaze direction of the meridian line having an inset value defined as an azimuth deviation with respect to a gaze direction passing through the far vision point. The pair is comprised of a first lens having part of the gaze directions defining the meridian line of this first lens which have substantially non-zero inset values, and a second lens wherein all the gaze directions which are located on the meridian line of this second lens between the far vision point and the near vision point have inset values substantially equal to zero.

In the context of the invention, a value substantially equal to zero means that this value is in the range between −1° (degree) and +1°, limit values excluded. Consistently, a substantially non-zero value is less than or equal to −1°, or higher than or equal to +1°. Commonly, inset values which are substantially non-zero relate to gaze directions oriented towards nasal side of each lens, corresponding to positive inset values by convention.

When the wearer who suffers from oculomotor disorder, is looking at objects which range from far vision distance to near vision distance, one of his eyes experiences difficulties for converging below a break distance which is intermediate between the far and near vision distances. When this eye is equipped with the second lens of a lens pair according to the invention, it can provide sharp vision only for the far vision distance because the meridian line of this second lens does not match the variation of the gaze direction. The image blurring for intermediate and near vision causes that the eye with insufficient convergence ability stops converging early during the progress of reducing the object distance, thus avoiding the discomfort and the symptoms of uncontrolled transitions between binocular and monocular visions.

According to an improvement of the invention, a width of far vision zone for the second lens may be greater than the width of far vision zone for the first lens. Although far vision is binocular for the wearer equipped with a lens pair according to the invention, the second lens may be thus dedicated to provide improved far vision comfort. For this purpose, it exhibits a wide range of far vision gaze directions for which the mean refractive power and the astigmatism produced by this second lens match the wearer's ametropia. A possible reduction in the area of the near vision zone for the second lens of the pair is less important, since the corresponding eye is no longer efficient for providing vision for objects which are located at short distance from the wearer. However, a reduction in the area of the near vision for the second lens of the pair allows to improve the peripheral vision and to reduce the distortion/swim effects, by reducing the gradients in resulting astigmatism and/or in refractive power which exist in the lateral zones. Preferably, an absolute difference between the respective widths of far vision zone for the first and second lenses may be higher than 4°, preferably higher than 8°.

Embodiments of the invention may also be improved by implementing one or several of the following optional features, separately or in combination with the above comparisons between the far vision zones of both lenses:

- a width of near vision zone for the first lens may be greater than a width of near vision zone for the second lens. Preferably, the absolute difference between the respective widths of near vision zone for the first and second lenses may be higher than 2°, preferably higher than 4°;
- the addition value for the first lens may be higher than the addition value for the second lens. Preferably, the difference between the respective addition values for the first and second lenses may be comprised between 0.20 diopter and 0.60 diopter;
- the pair of spectacle progressive lenses according to the invention may further meet at least one of the following conditions:
  - for each lens, a difference in maximum value of resulting astigmatism between the nasal side and the temporal side of the lens may be less than 10% of the maximum value of resulting astigmatism which exists for this lens;
  - for each lens, a difference in maximum value of mean refractive power gradient between the nasal side and the temporal side may be less than 20% of the maximum value of mean refractive power gradient which exists for this lens; and
  - for each lens, a difference in vision zone half-width between the temporal side and the nasal side may be less than 20% of the largest one of these vision zone half-widths, for each case among the vision zone being the far vision zone and the near vision zone, each vision zone half-width being measured from the meridian line of the corresponding lens; and the maximum value of resulting astigmatism for the first lens may be less than or equal to an addition value of this first lens, and another maximum value of resulting astigmatism for the second lens may be less than or equal to 90% of an addition value of this second lens.

A second aspect of the invention proposes a method for producing spectacles comprising progressive lenses, each lens separately having a far vision point, a near vision point, and a meridian line, the meridian line being defined by a set of gaze directions, each gaze direction of the meridian line having an inset value defined as an azimuth deviation with respect to a gaze direction passing through the far vision point, the method comprising the following steps:

/a/ determining one of the wearer's eyes as being dominant eye and the other one of the wearer's eye as being non-dominant eye; and /b/ assigning a first lens to the dominant eye and a second lens to the non-dominant eye, the first lens with some of the gaze directions defining the meridian line of this first lens which have substantially non-zero inset value, and the second lens having inset values substantially equal to zero for all the gaze directions located on the meridian line of the second lens between the far vision point and the near vision point;

/c/ then, optionally producing the first and second lenses.

The lens pair which is thus provided meets the first invention aspect, possibly with the improvements recited above.

In some implementations on the invention method, step /a/ may comprise performing a binocular convergence test with the wearer, the test comprising the following substeps:

/a1/ providing a visual stimulus in a sagittal plane of the wearer, this visual stimulus to be stared at by the wearer; and /a2/ moving continuously the visual stimulus within the sagittal plane from a maximum distance to a minimum distance, and determining a break distance between the maximum distance and the minimum distance at which one of the wearer's eyes first no longer stares continuously at the visual stimulus whereas the other eye still goes on with continuously staring at the visual stimulus for distances shorter than the break distance.

Then, the eye which stops staring continuously at the visual stimulus from the break distance is the non-dominant eye, and the other eye is the dominant one.

Possibly, step /b/ may be carried out only if the break distance determined in substep /a2/ is greater than or equal to 10 cm (centimeter), preferably greater than or equal to 20 cm.

When the addition value for the first lens is higher than the addition value for the second lens, then the addition value of the first lens may correspond to an addition value which is prescribed to the wearer.

These and other features of the invention will be now described with reference to the appended figures, which relate to preferred but not-limiting embodiments of the invention.

BRIEF DESCRIPTION OF THE DRAWINGS

For clarity sake, element sizes which appear in FIGS. 1 to 4 do not correspond to actual dimensions or dimension ratios. Also, same reference signs which are indicated in different ones of these figures denote identical elements.

Definitions

The following definitions are provided to describe the present invention.

"Prescription data" are known in the art. Prescription data refer to one or more data obtained for the wearer and indicating for each eye a prescribed far vision mean refractive power $P_{FV}$, and/or a prescribed astigmatism value $CYL_{FV}$ and/or a prescribed addition A suitable for correcting the ametropia and/or presbyopia of this eye. The mean refractive power $P_{FV}$ is obtained by summing the half value of the prescribed astigmatism value $CYL_{FV}$ to the prescribed sphere value $SPH_{FV}$: $P_{FV}=SPH_{FV}+CYL_{FV}/2$. Then, the mean refractive power for each eye for proximate vision, also denoted near vision, is obtained by summing the prescribed addition A to the far vision mean refractive power $P_{FV}$ prescribed for the same eye: $P_{NV}=P_{FV}+A$. In the case of a prescription for progressive lenses, prescription data comprise wearer data indicating for each eye values for $SPH_{FV}$, $CYL_{FV}$ and A.

Figure 1:
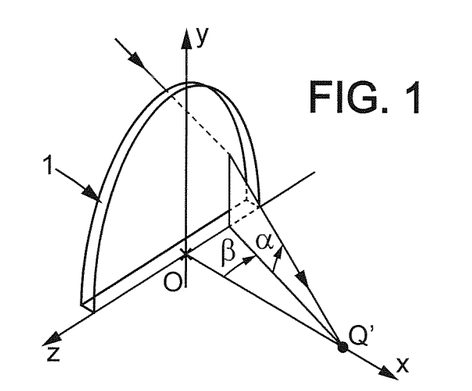
FIGS. 1 and 2 show diagrammatically optical systems comprised of eye and lens.
Figure 2:
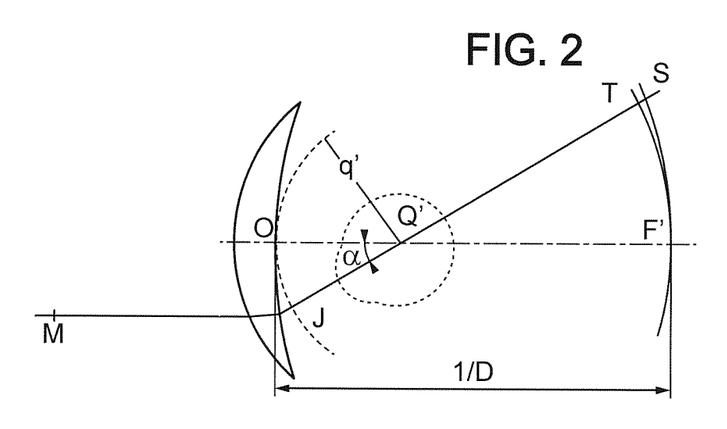

A "gaze direction" can be identified by a pair of angle values ($\alpha$, $\beta$), wherein the angle values are measured from reference axes originating from the center of rotation of the eye (CRE). FIG. 1 is a perspective view illustrating such angles $\alpha$ and $\beta$ used to define a gaze direction. FIG. 2 is a view in the vertical plane parallel to the antero-posterior axis of the wearer's head and passing through the center of rotation of the eye in the case when the parameter $\beta$ is equal to 0. The center of rotation of the eye is labeled Q'. The axis Q'F', shown on FIG. 2 in a dot-dash line, is the horizontal axis passing through the center of rotation of the eye and extending in front of the wearer. Thus the axis Q'F' corresponds to the primary gaze direction. This axis intersects the front surface of the lens at a point called the fitting cross, which is indicated on each lens to enable the positioning of the lens in a spectacle frame by an optician. The fitting cross corresponds to a lowering angle $\alpha$ of 0° and an azimuth angle $\beta$ of 0°. The point of intersection of the rear surface of the lens and the axis Q'F' is the point O. A vertex sphere, of center Q' and radius q', is intercepting the rear surface of the lens at point O of the horizontal axis. As an example, a usual value for radius q' is 25.5 mm, which provides satisfying results when wearing the lenses. The image of a point located in the object space at infinity along direction OQ' is formed at point F'. The distance OF' corresponds to the rear focal length of the lens.

A given gaze direction represented by a solid line on FIG. 1, corresponds to a position of the eye in rotation about Q' and to a point J (see FIG. 2) of the vertex sphere. The angle $\beta$ is comprised between the axis Q'F' and the projection of the straight line Q'J on the horizontal plane comprising the axis Q'F'. This angle $\beta$ appears on FIG. 1. The angle $\alpha$ is that comprised between the axis Q'J and the projection of the straight line Q'J on the horizontal plane comprising the axis Q'F'. This angle α appears on FIGS. 1 and 2. A given gaze direction thus corresponds to a point J of the vertex sphere or to a pair (α, β). Positive values for the angle a denote gaze directions oriented downwards, below the horizontal plane. Positive values for the azimuth angle β denote gaze directions for each eye which are rotated towards the wearer's nose. The fitting cross corresponds to the lowering angle α equal to 0° and the azimuth angle β also equal to 0°.

On the lens, for each gaze direction (α, β), a mean refractive power $PPO_{\alpha,\beta}$, a module of astigmatism $Ast_{\alpha,\beta}$ and an axis $Axe_{\alpha,\beta}$ of this astigmatism, and a module of resulting (also called residual or unwanted) astigmatism $Asr_{\alpha,\beta}$ are defined in a common way.

"Ergorama" is a function assigning to each gaze direction the usual distance of an object point. Typically, in far vision along the primary gaze direction, the object point is at infinity. In near vision along a gaze direction essentially corresponding to an angle α of the order of 30° to 36° and to an angle β of the order of 5° towards the nasal side, the object distance is of the order of 30 to 50 cm. For more details concerning a possible definition of an ergorama, U.S. Pat. No. 6,318,859 may be considered. This document describes an ergorama, its definition and its modeling method. The ergorama may be a function of the wearer's ametropia.

Using these elements, it is possible to define a wearer mean refractive power and astigmatism for each gaze direction. An object point M at an object distance given by the ergorama is considered for a gaze direction (α, β). An object proximity ProxO is defined for the point M on the corresponding light ray in the object space as the inverse of the distance MJ between point M and point J of the vertex sphere:

ProxO=1/MJ

This enables to calculate the object proximity within a thin lens approximation for all points of the vertex sphere, which is used for the determination of the ergorama. For a real lens, the object proximity can be considered as the inverse of the distance between the object point and the front surface of the lens, on the corresponding light ray.

For the same gaze direction (α, β), In a given gaze direction, the image of a point M in the object space, located at a given object distance, is formed between two points S and T corresponding to minimum and maximum distances JS and JT, which would be the sagittal and tangential local focal lengths. The quantity Prox I is called image proximity of the point M:

$$Pr\,oxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an mean refractive power PPO as the sum of the image proximity and the object proximity.

PPO=ProxO+ProxI

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens.

Figure 3:
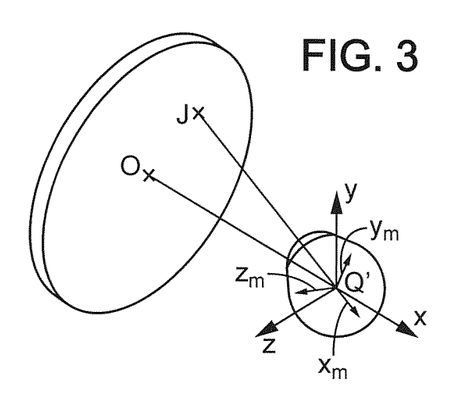
FIG. 3 shows a ray tracing from the center of rotation of the eye.

FIG. 3 is a perspective view of a configuration wherein the angles α and β are non-zero. The effect of rotation of the eye can thus be illustrated by showing a fixed frame {x, y, z} and a frame {$x_m$, $y_m$, $z_m$} linked to the eye. Frame {x, y, z} has its origin at the point Q'. The axis x is the axis Q'O and it is orientated from the lens towards the eye. The y axis is vertical and orientated upwardly. The z axis is such that the frame {x, y, z} is orthonormal and direct. The frame {$x_m$, $y_m$, $z_m$} is linked to the eye and its center is the point Q'. The $x_m$ axis corresponds to the gaze direction JQ'. Thus, for a primary gaze direction, the two frames {x, y, z} and {$x_m$, $y_m$, $z_m$} are the same. For simplicity, the term 'lens' is used in the description but it has to be understood as the 'ergorama-eye-lens system'.

For a progressive ophthalmic lens, the "meridian line" is the set of all gaze directions which are oriented toward objects located within the sagittal plane of the lens wearer. The exact location of each object within the sagittal plane, as a function of the lowering angle α, is provided by the ergorama. Then the lens manufacturer designs the progressive ophthalmic lens so that best vision is provided to the wearer along the meridian line. In particular, the resulting astigmatism is reduced to zero or almost zero for all gaze directions of the meridian line. In particular, a far vision gaze direction, the fitting cross and a near vision gaze direction are located on the meridian line. These reference gaze directions can be recovered from permanent markings existing on each progressive ophthalmic lens in a manner which is well-know in the art. Possibly, manufacturer's instructions may be necessary for recovering the far and near vision gaze directions from the permanent markings, but the manufacturer's instructions are always available to the Man skilled in ophthalmics. One may report in this concern to the harmonized standard ISO 8980-2 published on 2004-02-01 (ISO 8980-2:2004). Temporary markings may also be applied on the surface of a progressive ophthalmic lens, indicating locations of control points on the lens, such as a control point for far vision, a control point for near vision, a prism reference point and the fitting cross for instance. If the temporary markings are absent or have been erased, it is always possible to a skilled person to locate the control points on the lens by using a mounting chart and the permanent micro-markings. Indeed, item 7.1 c) of the standard ISO 8980-2 specifies that the manufacturer's name must be permanently indicated on the progressive addition lens, and item 8.1 of the same standard ISO 8980-2 indicates additional information which must be specified on the lens packaging or accompanying documents. It refers to Article 6 of ISO 14889:2003 for reciting this additional information or information which must be available on request to the lens manufacturer. This latter comprises lens alignment rules for recovering the locations of all reference points and measurement points which may be non-permanently marked on the lens, including the fitting cross, the prism reference point, the far vision control point, the near vision control point (item 6.2 f) of ISO 14889 referring back to item 7.2 a) to e) of ISO 8980-2). Therefore, all these points are set unambiguously for any progressive ophthalmic lens, from the initial design and the manufacturing of this lens, and cannot be selected another way when analyzing this lens later.

For any gaze direction of the meridian line, the "inset value" denotes the difference in the azimuth angle value β between this gaze direction and the far vision gaze direction. Actually, the azimuth angle value β for the far vision gaze direction is zero, so that the inset value of any gaze direction of the meridian line equals the azimuth angle value β of this gaze direction.

"Far vision zone temporal half-width" is the angular distance, at constant lowering angle, between the far vision gaze direction and a gaze direction on the temporal side of the lens where the module of resulting astigmatism reaches a threshold value.

"Far vision zone nasal half-width" is the angular distance, at constant lowering angle, between the far vision gaze direction and a gaze direction on the nasal side of the lens where the module of resulting astigmatism reaches a threshold value.

"Near vision zone temporal half-width" is the angular distance, at constant lowering angle, between the proximate vision gaze direction and a gaze direction on the temporal side of the lens where the module of resulting astigmatism reaches a threshold value;

"Near vision zone nasal half-width" is the angular distance, at constant lowering angle, between the proximate vision gaze direction and a gaze direction on the nasal side of the lens where the module of resulting astigmatism reaches a threshold value.

The threshold value is chosen once for all the considered vision zone half-widths among the set [0.25 D; 0.5 D], D standing for diopter unit.

The mean refractive power gradient values are evaluated by considering the norm of the gradient for the gaze directions within a circular domain centered on (α=0°; β=0°), of radius 40° and excluding a region of ±4° along the azimuth axis on each side of the meridian line.

Resulting astigmatism values are evaluated for the gaze directions within a circular domain centered on (α=0°; β=0°), of radius 40°.

For a progressive ophthalmic lens which meets the data prescribed for one wearer, numerous possible distributions for the mean refractive power and the resulting astigmatism may be implemented over the whole lens. Each distribution of both the mean refractive power and the resulting astigmatism as functions of the lowering angle α and the azimuth angle β is called "optical design". Then a lens is completely and unambiguously described by maps of mean refractive power and resulting astigmatism.

DETAILED DESCRIPTION OF THE INVENTION

Figure 4A:
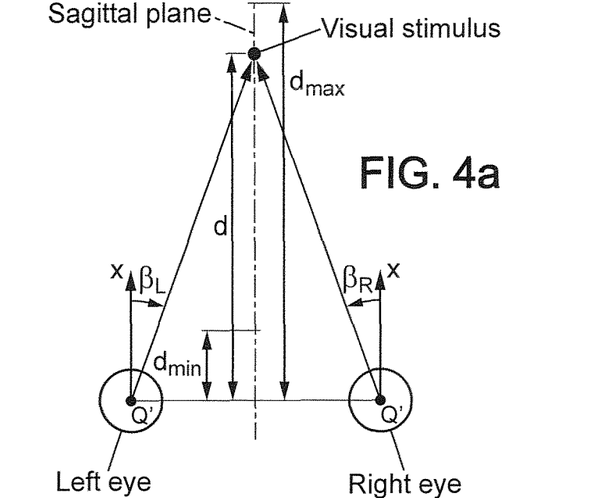
FIGS. 4a to 4c illustrate a binocular convergence test carried out with the wearer.
Figure 4B:
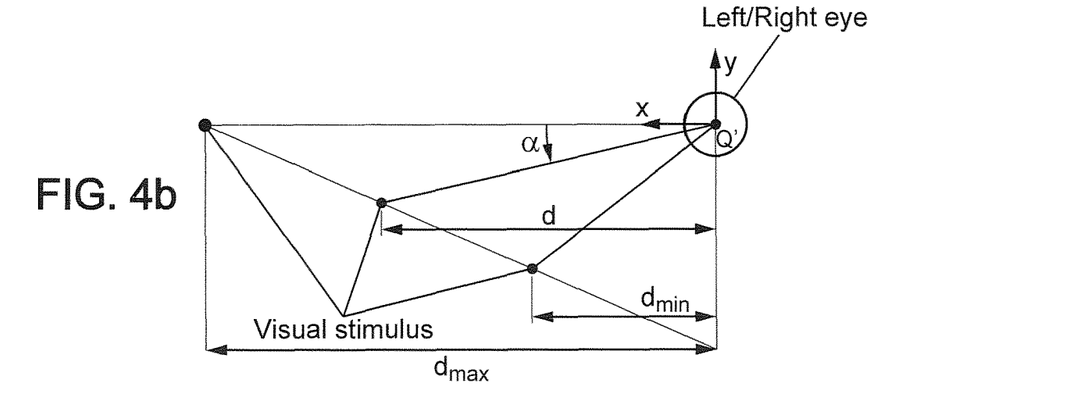
Figure 4C:
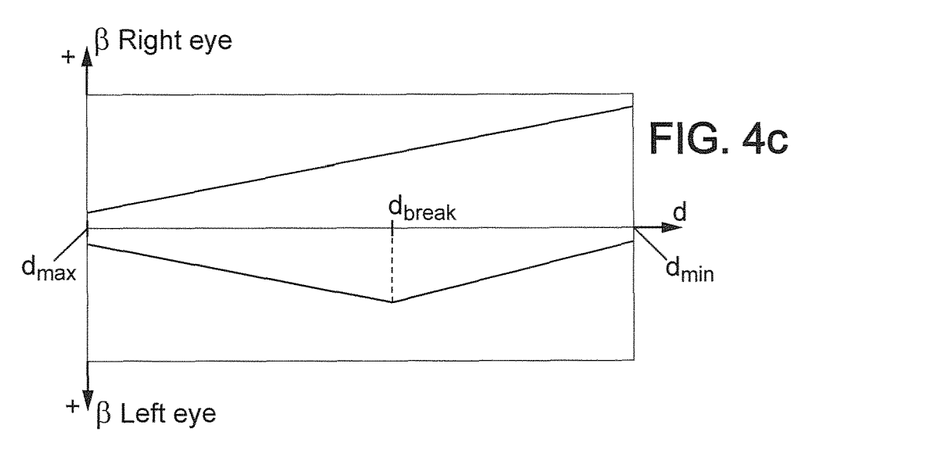

FIGS. 4a and 4b illustrate a convergence test which may be performed with the wearer, respectively as a top view and in the sagittal plane of the wearer. A visual stimulus such as a small object is moved within the sagittal plane from a maximum distance $d_{max}$ to a minimum distance $d_{min}$. The wearer's head is vertical and the object distance d is measured from the nose base of the wearer. For example, $d_{max}$ equals 2 m (meter) and $d_{min}$ equals 5 cm (centimetre). Preferably the convergence test may be carried out with the wearer being devoid of any ophthalmic spectacle lenses. The wearer is asked to keep on staring at the visual stimulus while the object distance d is reduced. Then, the values of the gaze direction azimuth angle β are plotted for both eyes as a function of the object distance d. $β_R$ and $β_L$ relate to the left eye and the right eye respectively. Values of the lowering angle α are not used for the test. FIG. 4c reproduces a typical plot obtained from such convergence test. The object distance d is reported decreasingly along the horizontal direction, and the azimuth angles β along the vertical direction. The upper and lower diagram portions correspond respectively to right eye and left eye. From the value $d_{max}$ for the object distance d, both eyes remain oriented simultaneously towards the visual stimulus, resulting in azimuth angle values which increase continuously. It is possible that both tracks are constant in slope and symmetric down to the value $d_{min}$. But it happens for numerous wearers that one of the eyes stops being oriented towards the visual stimulus when the object distance d goes on reducing, while the other eye remains being oriented towards the visual stimulus continuously. The value of the object distance d which corresponds to the convergence stop for one of the eyes is called break distance and denoted $d_{break}$. Convergence insufficiency is stated for one wearer when his break distance $d_{break}$ is larger than 20 cm. Such wearer is mainly concerned with the present invention. However, wearers with break distances ranging between 20 cm and 10 cm may also take advantage of the invention.

The wearer's eye which determines the break distance $d_{break}$ is called non-dominant eye, and the other wearer's eye which continues being oriented towards the visual stimulus for object distances shorter than the break distance is called dominant eye. In the exemplary diagram of FIG. 4c, the right eye is dominant and the left eye is non-dominant.

The prescription data for the wearer are obtained. The invention applies for a presbyopic wearer, namely when the prescribed addition value for both eyes is non-zero. Then the spectacle lenses are provided for both right and left eyes of the wearer in the following manner, according to the invention.

A lens design is selected for the non-dominant eye by considering the optical data prescribed for this eye, but also by selecting a lens design with inset values on the meridian line which substantially equal zero between the far vision gaze direction and the near vision gaze direction. Namely, the inset values for the gaze directions located on the meridian line and between the far vision gaze direction and the near vision gaze direction are less than 1°.

Another lens design is selected for the dominant eye, also considering the optical data which are prescribed for this other eye, but with a shape of the meridian line which suits the convergence experienced by this eye for objects which are located within the sagittal plane at varying distances. Therefore, the lens design to be used for the dominant eye exhibits non-zero inset values at least for all gaze directions on the meridian line which are oriented below the fitting cross. In particular, the near vision gaze direction may have an inset value higher than 3°, preferably higher than 4°, and possibly up to about 7°.

Figure 5A:
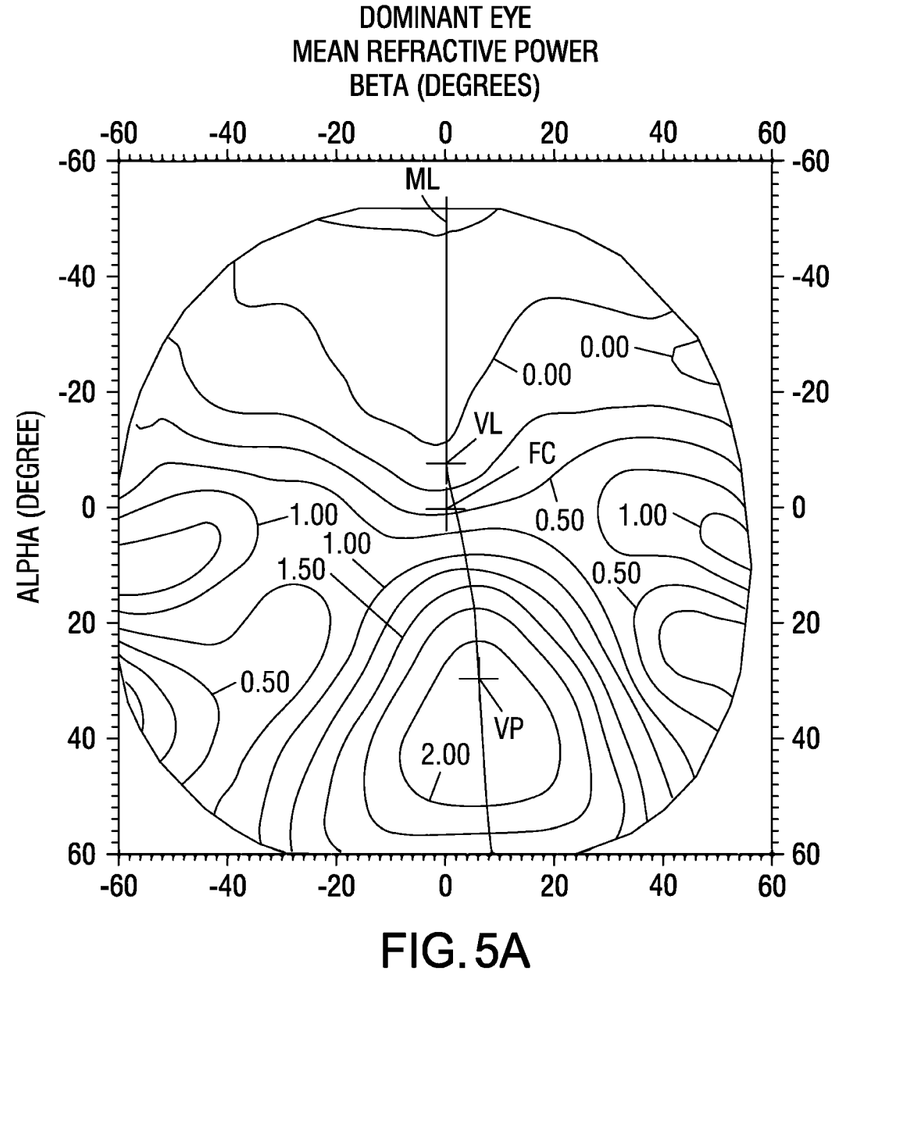
FIGS. 5a and 5b are maps of mean refractive power for a lens pair according to the invention.
Figure 5B:
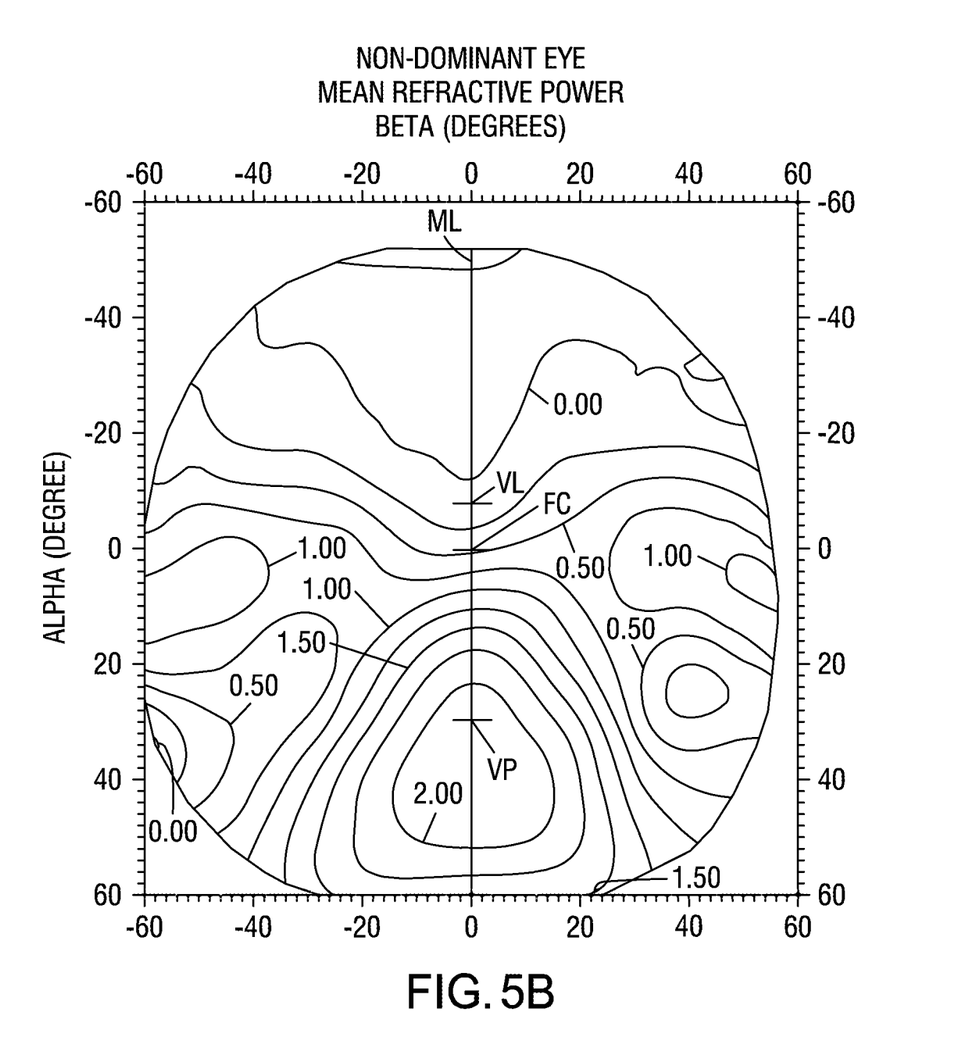
Figure 5C:
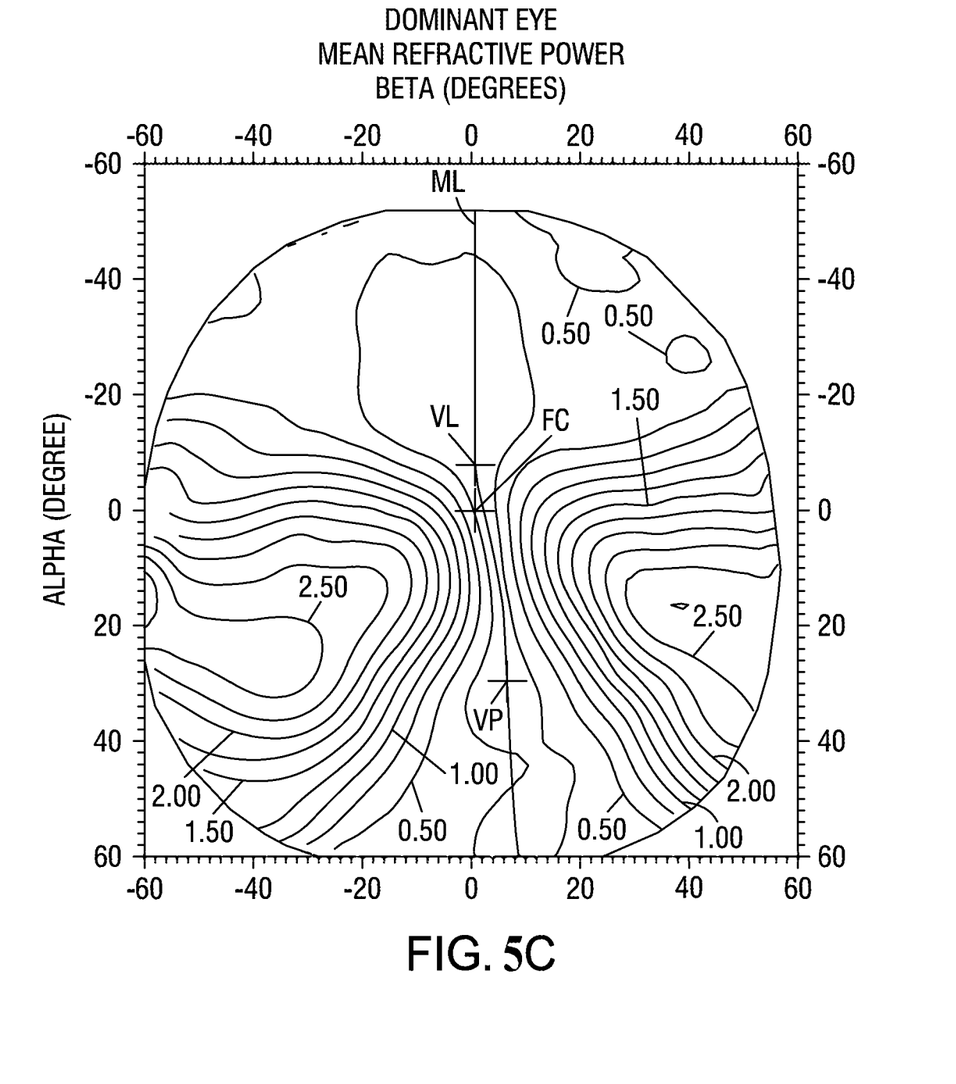
FIGS. 5c and 5d are maps of resulting astigmatism respectively for the lenses of FIGS. 5a and 5b.
Figure 5D:
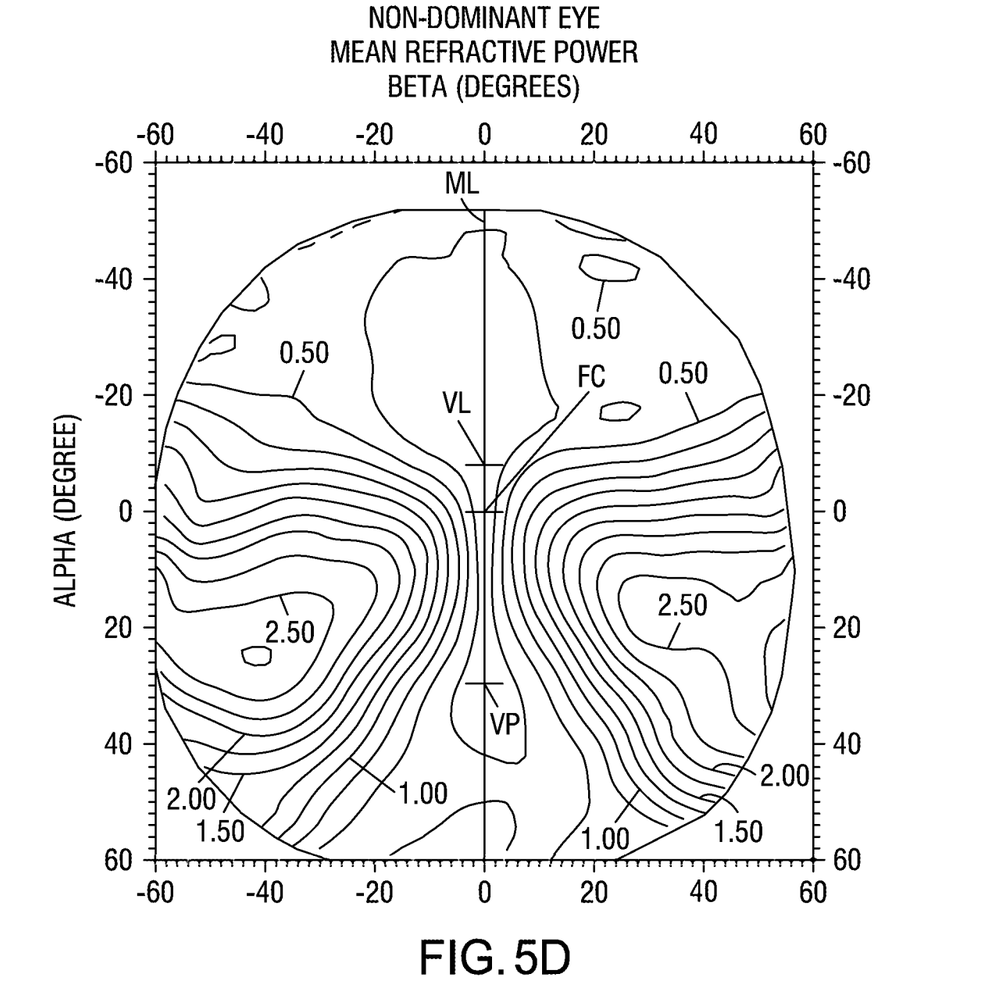

FIGS. 5a and 5c are respectively a mean refractive power map and a resulting astigmatism map for a lens dedicated to the dominant wearer's eye, the right eye in the example. FIGS. 5b and 5d relate to the lens dedicated to the non-dominant eye, the left eye in the same example. Reference signs VL, FC, VP and ML denote respectively the far vision gaze direction, the fitting cross, the near vision gaze direction and the meridian line for each lens. The value of the lowering angle a for the far vision gaze direction VL is −8°, and that for the near vision gaze direction VP is +30°. Unit for the mean refractive power and the resulting astigmatism is dioptre. The prescribed mean refractive power value for far vision for both eyes is 0.00 diopter. This value corresponds substantially to the mean refractive power which is produced actually by each lens at the far vision gaze direction VL. The prescribed addition for both eyes is 2.00 diopters, which also corresponds to the increase in the mean refractive power which is produced by either lens between the far vision gaze direction VL and the near vision gaze direction VP.

The lenses are produced using any manufacturing method well-known in the field of spectacle progressive lenses. In particular, the free-form™ manufacturing process may be used advantageously.

When the wearer equipped with the lenses of FIGS. 5a to 5d switches from objects which are located 2 meter-remote from him in the sagittal plane at 8° above the main vision direction, to other objects located at about 40 cm from him again in the sagittal plane but below the main vision direction, both eyes start lowering and converging. The gaze direction of the dominant eye moves down along the meridian line ML of the lens dedicated to this eye. But the non-dominant eye experiences mean refractive power and resulting astigmatism values which do not suit when starting converging, because the gaze direction for this eye shifts out of the canal of the corresponding lens, which is vertical. This canal shape leads the non-dominant eye to stop converging. The symptoms due to convergence imbalance in binocular vision are thus avoided. Accurate vision is provided to the wearer's dominant eye for all gaze directions in the far vision zone, intermediate vision zone and near vision zone. The non-dominant eye experiences sharp vision only in the far vision zone of the corresponding lens, but not in the intermediate and near vision zone. Therefore, the near vision zone and/or the mean refractive power value for the near vision gaze direction VP may be reduced for the non-dominant eye, for improving the far vision conditions existing for this non-dominant eye. This improvement may be achieved by reducing the horizontal width of the near vision zone and/or using an addition value which is less than the prescribed value for the non-dominant eye. Then, the lens which is dedicated to the dominant eye is advantageously optimized so as to compensate for the suppression of the non-dominant eye when performing near vision tasks. So it may be optimized for near vision. In particular, the increase in the mean refractive power which is actually produced by the lens dedicated to the dominant eye, between the far and near vision gaze directions, matches the addition value prescribed for this dominant eye. Such correlated optimization of both lenses may be provided by one or several of the following features:

the width of far vision zone may be greater for the non-dominant eye compared to that for the dominant eye. In particular, a width difference of at least 4°, preferably at least 8° may be provided between the far vision zones of both lenses. Such width may be measured for the lowering angle value of the far vision gaze direction VL between both iso-curves of resulting astigmatism equal to 0.25 diopter, located on the nasal and temporal sides. Alternatively, each width of far vision zone may be measured between iso-curves of resulting astigmatism equal to 0.50 diopter; and/or the width of near vision zone may be greater for the dominant eye compared to that for the non-dominant eye. In particular, a width difference of at least 2°, preferably at least 4° may be provided between the near vision zones of both lenses. Such width may be measured for the lowering angle value of the near vision gaze direction VP between both iso-curves of resulting astigmatism equal to 0.25 diopter, located on the nasal and temporal sides. Alternatively, each width of near vision zone may be measured between iso-curves of resulting astigmatism equal to 0.50 diopter; and/or the addition value of the lens dedicated to the non-dominant eye may be less than that of the lens dedicated to the dominant eye. Preferably, a difference between the respective addition values of both lenses may be comprised between 0.20 diopter and 0.60 diopter.

It is then possible to produce both lenses with resulting astigmatism less than commonly achieved when each lens is optimized simultaneously for both far vision and near vision. In particular, the maximum value of resulting astigmatism for the lens dedicated to the dominant eye may be less than or equal to the addition value of this lens. And, the maximum value of resulting astigmatism for the other lens which is dedicated to the non-dominant eye may be also reduced, in particular less than or equal to 90% of the addition value of this other lens.

In addition, for each lens, the design in the nasal side of the lens should preferably not be too much different from the design in the temporal side of the lens. To this purpose, the inventors have identified the following criteria for ensuring that no inconvenience is caused to the wearer by the design difference existing between both lenses:

for each lens, the difference in maximum value of resulting astigmatism between the nasal side and the temporal side should be less than 10% of the maximum value of resulting astigmatism;

for each lens, the difference in maximum value of mean refractive power gradient between the nasal side and the temporal side should be less than 20% of the maximum value of mean refractive power gradient; and for each lens, a difference between the vision zone nasal half-width and the vision zone temporal half-width should be less than 20% of the maximum vision zone half-width, for each case among the vision zone being the far vision zone and the near vision zone. Each vision zone half-width may be measured to this purpose from the meridian line ML.

Figure 6A:
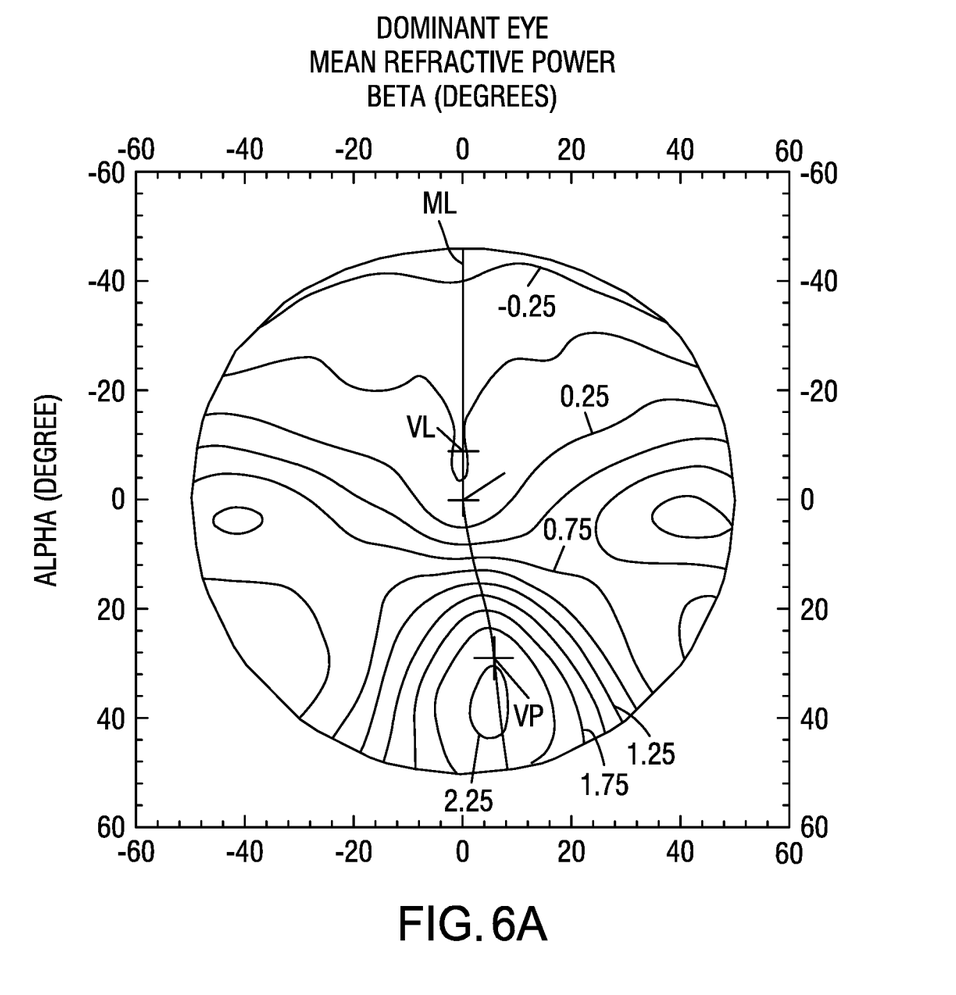
FIGS. 6a to 6d correspond respectively to FIGS. 5a to 5d for another lens pair according to the invention.
Figure 6B:
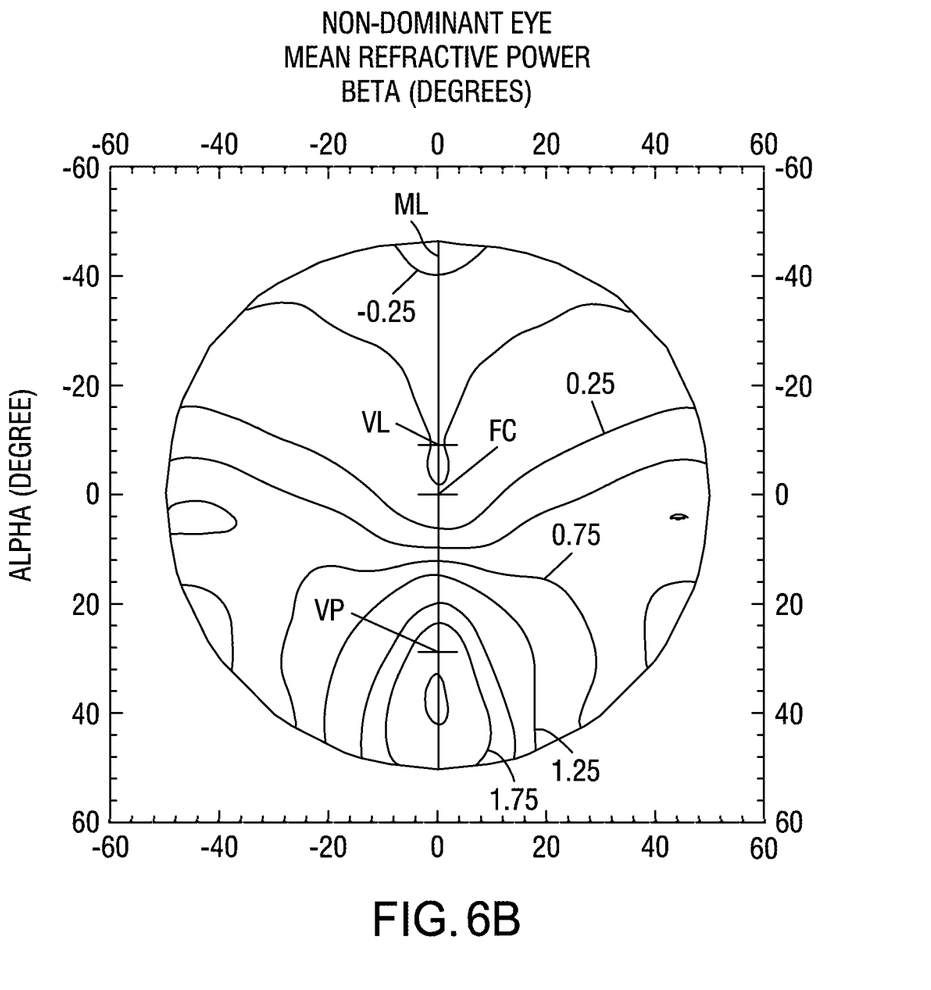
Figure 6C:
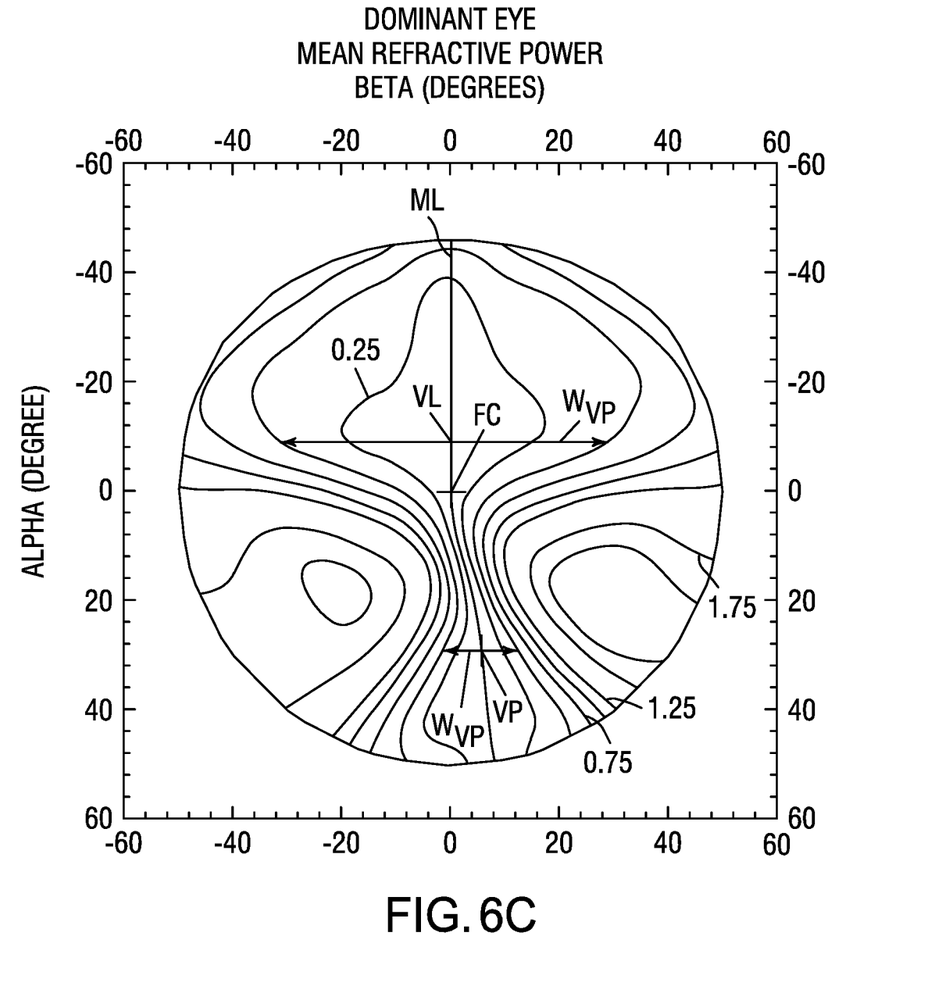
Figure 6D:
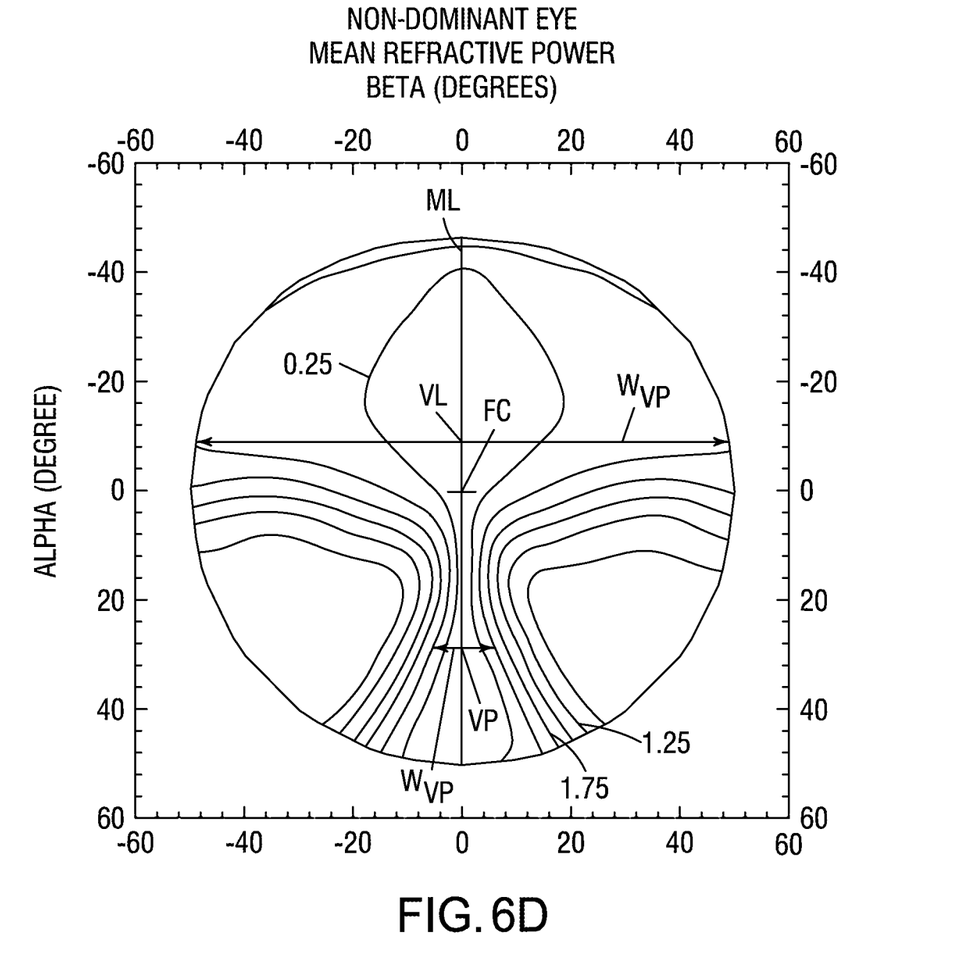

FIGS. 6a to 6d illustrate such improvement of the invention. The mean refractive power value which is produced by both lenses is zero again for the far vision gaze direction VL. The addition value produced by the lens dedicated to the dominant eye is 2.25 diopters (FIG. 6a), and that produced the lens dedicated to the non-dominant eye is 2.00 diopters (FIG. 6b). The width of the far vision zone, denoted $W_{VL}$ and measured at the lowering angle value of the far vision gaze direction VL, is 59.4° for the dominant eye (FIG. 6c), and larger than the transversal lens extension for the non-dominant eye (FIG. 6d). The width of the near vision zone, denoted $W_{VP}$ and measured at the lowering angle value of the near vision gaze direction VP, is 14° for the dominant eye, and 11.6° for the non-dominant eye. The other optical features of this other lens pair according to the invention are:

for the dominant eye (FIGS. 6a and 6c):
maximum value of resulting astigmatism on temporal side: 2.06 D (D standing for diopter)
maximum value of resulting astigmatism on nasal side: 2.22 D
the maximum value of resulting astigmatism is lower than the addition value
resulting astigmatism difference between nasal and temporal sides: less than 8% of the maximum resulting astigmatism value of 2.22 D
maximum value of mean refractive power gradient on temporal side: 0.097 D/deg (deg standing for degree)
maximum value of mean refractive power gradient on nasal side: 0.113 D/deg mean refractive power gradient difference between nasal and temporal sides: less than 15% of the maximum gradient value of 0.113 far vision zone temporal half-width: 31.1 deg far vision zone nasal half-width: 28.3 deg far vision zone half-width difference between nasal and temporal sides: less than 10% of the far vision zone temporal half-width near vision zone temporal half-width: 7.3 deg near vision zone nasal half-width: 6.7 deg near vision half-width difference between nasal and temporal sides: less than 9% of the near vision zone temporal half-width for the non-dominant eye (FIGS. 6b and 6d):

maximum value of resulting astigmatism on temporal side: 1.74 D maximum value of resulting astigmatism on nasal side: 1.67 D maximum value of resulting astigmatism is lower than 90% of the addition value resulting astigmatism difference between nasal and temporal side: less than 5% of the maximum resulting astigmatism value of 1.74 D maximum value of mean refractive power gradient on temporal side: 0.090 D/deg maximum value of mean refractive power gradient on nasal side: 0.100 D/deg mean refractive power gradient difference between nasal and temporal sides: less than 10% of the maximum gradient value of 0.100 D/deg far vision zone temporal half-width: 50.3 deg far vision zone nasal half-width: 51.4 deg far vision zone half-width difference between nasal and temporal sides: less than 3% of the far vision zone nasal half-width near vision zone temporal half-width: 5.5 deg near vision zone nasal half-width: 6.1 deg near vision half-width difference between nasal and temporal sides: less than 10% of the near vision zone nasal half-width In this example, the vision zone widths and half-widths are evaluated with respect to the 0.50 diopter resulting astigmatism iso-curve.

The invention claimed is:

1. Spectacles comprising:
a pair of progressive lenses to be worn by a wearer, each lens separately having a far vision point, a near vision point, and a meridian line defined by a set of gaze directions, each gaze direction of the meridian line having an inset value defined as an azimuth deviation with respect to a gaze direction passing through the far vision point, the pair comprising:
a first lens with some of the gaze directions defining the meridian line of the first lens which have substantially non-zero inset values, and
a second lens,
wherein all the gaze directions located on the meridian line of the second lens between the far vision point and the near vision point have inset values substantially equal to zero.

2. The spectacles according to claim 1, wherein a width of far vision zone of the second lens is greater than a width of far vision zone of the first lens, the width of far vision zone being measured for a lowering angle value of the far vision gaze direction between both iso-curves of resulting astigmatism equal to 0.25 diopter, located on nasal and temporal sides.

3. The spectacles according to claim 2, wherein an absolute difference between the respective widths of far vision zone for the first and second lenses is higher than 4°.

4. The spectacles according to claim 2, wherein an absolute difference between the respective widths of far vision zone for the first and second lenses is higher than 8°.

5. The spectacles according to claim 1, wherein a width of near vision zone of the first lens is greater than a width of near vision zone of the second lens, the width of near vision zone being measured for a lowering angle value of the near vision gaze direction between both iso-curves of resulting astigmatism equal to 0.25 diopter, located on nasal and temporal sides.

6. The spectacles according to claim 5, wherein an absolute difference between the respective widths of near vision zone for the first and second lenses is higher than 2°.

7. The spectacles according to claim 5, wherein an absolute difference between the respective widths of near vision zone for the first and second lenses is higher than 4°.

8. The spectacles according to claim 1, wherein an addition value of the first lens is higher than an addition value of the second lens.

9. The spectacles according to claim 8, wherein a difference between the respective addition values of the first and second lenses is between 0.20 diopter and 0.60 diopter.

10. The spectacles according to claim 1, further meeting at least one of following conditions:
for each lens, a difference in maximum value of resulting astigmatism between a nasal side and a temporal side of the lens is less than 10% of a maximum value of resulting astigmatism existing for the lens;
for each lens, a difference in maximum value of mean refractive power gradient between the nasal side and the temporal side is less than 20% of a maximum value of mean refractive power gradient existing for the lens; and
for each lens, a difference between a vision zone nasal half-width and a vision zone temporal half-width is less than 20% of a largest one of the vision zone nasal and temporal half-widths, for each case among the vision zone being the far vision zone, and the near vision zone, and each vision zone half-width being measured from the meridian line.

11. The spectacles according to claim 1, wherein a maximum value of resulting astigmatism for the first lens is less than or equal to an addition value of the first lens, and another maximum value of resulting astigmatism for the second lens is less than or equal to 90% of an addition value of the second lens.

12. A method for producing the first and second lenses of spectacles including a pair of progressive lenses, each lens separately having a far vision point, a near vision point, and a meridian line, the meridian line being defined by a set of gaze directions, each gaze direction of the meridian line having an inset value defined as an azimuth deviation with respect to a gaze direction passing through the far vision point, the method comprising:
determining one of the wearer's eyes as being a dominant eye and the other one of the wearer's eye as being a non-dominant eye;
assigning a first lens to the dominant eye and a second lens to the non-dominant eye, the first lens with some of the gaze directions defining the meridian line of the first lens which have substantially non-zero inset values, and the second lens having inset values substantially equal to zero for all the gaze directions located on the meridian line of the second lens between the far vision point and the near vision point; and producing the first and second lenses.

13. The method according to claim 12, wherein the determining comprises performing a binocular convergence test with the wearer, the test comprising:

providing a visual stimulus in a sagittal plane of the wearer, the visual stimulus to be stared at by the wearer; and moving continuously the visual stimulus within the sagittal plane from a maximum distance to a minimum distance, and determining a break distance between the maximum distance and the minimum distance at which one of the wearer's eyes first no longer stares continuously at the visual stimulus whereas the other eye still goes on with continuously staring at the visual stimulus for distances shorter than the break distance;

wherein the eye which stops staring continuously at the visual stimulus from the break distance is the non-dominant eye, and the other eye is the dominant eye.

14. The method according to claim 13, wherein the assigning is carried out when the break distance determined in the moving is greater than or equal to 10 cm.

15. The method according to claim 13, wherein the assigning is carried out when the break distance determined in the moving is greater than or equal to 20 cm.

16. The method according to claim 12, wherein a width of far vision zone of the second lens is greater than a width of far vision zone of the first lens, the width of far vision zone being measured for a lowering angle value of the far vision gaze direction between both iso-curves of resulting astigmatism equal to 0.25 diopter, located on nasal and temporal sides.

17. The method according to claim 12, wherein an addition value of the first lens is higher than an addition value of the second lens, and the addition value of the first lens corresponds to an addition value prescribed to the wearer.

18. A method for producing the first and second lenses of spectacles including a pair of progressive lenses, each lens separately having a far vision point, a near vision point, and a meridian line, the meridian line being defined by a set of gaze directions, each gaze direction of the meridian line having an inset value defined as an azimuth deviation with respect to a gaze direction passing through the far vision point, the method comprising:

determining one of the wearer's eyes as being a dominant eye and the other one of the wearer's eye as being a non-dominant eye;

assigning a first lens to the dominant eye and a second lens to the non-dominant eye, the first lens with some of the gaze directions defining the meridian line of the first lens which have substantially non-zero inset values, and the second lens having inset values substantially equal to zero for all the gaze directions located on the meridian line of the second lens between the far vision point and the near vision point; and producing the first and second lenses;

wherein the determining comprises performing a binocular convergence test with the wearer, said test comprising:

providing a visual stimulus in a sagittal plane of the wearer, said visual stimulus to be stared at by the wearer; and moving continuously the visual stimulus within the sagittal plane from a maximum distance to a minimum distance, and determining a break distance between the maximum distance and minimum distance at which one of the wearer's eyes first no longer stares continuously at the visual stimulus whereas the other eye still goes on with continuously staring at the visual stimulus for distances shorter than the break distance, and wherein the eye which stops staring continuously at the visual stimulus from the break distance is the non-dominant eye, and the other eye is the dominant eye.

\* \* \* \* \*